US009342611B2

(12) United States Patent
Vellozo Luz et al.

(10) Patent No.: US 9,342,611 B2
(45) Date of Patent: May 17, 2016

(54) SYSTEMS AND METHODS FOR TRANSFERRING PERSONAL DATA USING A SYMBOLOGY

(75) Inventors: Andre Gustavo Vellozo Luz, Sao Paulo-SP (BR); Mauricio Ghetler, São Paulo-SP (BR)

(73) Assignee: PAYCHIEF LLC, New York, NY (US)

( * ) Notice: Subject to any disclaimer, the term of this patent is extended or adjusted under 35 U.S.C. 154(b) by 0 days.

(21) Appl. No.: 13/531,143

(22) Filed: Jun. 22, 2012

(65) Prior Publication Data

US 2013/0341391 A1    Dec. 26, 2013

(51) Int. Cl.
*G06F 17/00*    (2006.01)
*G06F 17/30*    (2006.01)

(52) U.S. Cl.
CPC ................. *G06F 17/30879* (2013.01)

(58) Field of Classification Search
USPC ........................................ 235/375
See application file for complete search history.

(56) References Cited

U.S. PATENT DOCUMENTS

| | | | |
|---|---|---|---|
| 5,317,135 A | 5/1994 | Finocchio | |
| 6,993,507 B2 | 1/2006 | Meyer et al. | |
| 7,207,481 B2 | 4/2007 | Barenburg et al. | |
| 7,427,017 B2 | 9/2008 | Morrison et al. | |
| 7,909,243 B2 | 3/2011 | Merkow et al. | |
| 8,002,175 B2 | 8/2011 | Kuriyama et al. | |
| 8,214,619 B1 | 7/2012 | Connolly et al. | |
| 2002/0010800 A1 | 1/2002 | Riley et al. | |
| 2002/0111884 A1 | 8/2002 | Groat et al. | |
| 2003/0134648 A1 | 7/2003 | Reed et al. | |
| 2004/0039937 A1 | 2/2004 | Aissi et al. | |
| 2007/0277224 A1 | 11/2007 | Osborn et al. | |
| 2008/0313081 A1 | 12/2008 | Wee | |
| 2010/0017860 A1 | 1/2010 | Ishida | |
| 2010/0138344 A1 | 6/2010 | Wong et al. | |
| 2011/0029769 A1 | 2/2011 | Aissi et al. | |
| 2011/0231268 A1 | 9/2011 | Ungos | |
| 2011/0246291 A1 | 10/2011 | Paul | |
| 2011/0251892 A1 | 10/2011 | Laracey | |
| 2011/0264586 A1 | 10/2011 | Boone et al. | |
| 2011/0270751 A1* | 11/2011 | Csinger .................. | G06F 21/40 705/42 |
| 2011/0282965 A1 | 11/2011 | Dodson | |
| 2011/0283196 A1 | 11/2011 | Berger et al. | |
| 2011/0289009 A1* | 11/2011 | Rankin, Jr. ............. | G06Q 10/10 705/313 |

(Continued)

OTHER PUBLICATIONS

Tesco Homplus Subway Virtual Store, Legendado PT, BR, YouTube: http://www.youtube.com/watch?v=1WBw1AmduSo.

*Primary Examiner* — Michael G Lee
*Assistant Examiner* — David Tardif
(74) *Attorney, Agent, or Firm* — Pepper Hamilton LLP (57) ABSTRACT

Methods and systems for sending personal data using a symbology are disclosed. An entity computing device transmits a request to a remote computing device to define a transaction code and an associated symbology used to request personal data, which are returned to the requesting entity computing device. The entity displays the symbology in a manner accessible by a user. When a user scans the symbology using a user electronic device, the user electronic device determines the transaction code based on the symbology and transmits the transaction code to the remote computing device. The remote computing device identifies the user of the user electronic device and the personal data to transmit for the user with the user electronic device and transmits the personal data to the entity computing device, which uses the personal data to populate an online form or other construct.

23 Claims, 7 Drawing Sheets

(56) References Cited

U.S. PATENT DOCUMENTS

| | | |
|---|---|---|
| 2012/0060030 A1 | 3/2012 | Lamb |
| 2012/0203696 A1* | 8/2012 | Morgan ............ G06Q 20/3276 705/44 |
| 2012/0203701 A1 | 8/2012 | Ayuso de Paul |
| 2013/0061337 A1 | 3/2013 | Zimberoff et al. |
| 2013/0069794 A1 | 3/2013 | Terwilliger et al. |
| 2013/0107732 A1 | 5/2013 | O'Donnell et al. |
| 2013/0110637 A1 | 5/2013 | Bott |
| 2013/0124412 A1 | 5/2013 | Itwaru |
| 2013/0167213 A1 | 6/2013 | Sandhu et al. |
| 2013/0205380 A1 | 8/2013 | Avni et al. |
| 2013/0222055 A1 | 8/2013 | Schaefer et al. |
| 2013/0232549 A1 | 9/2013 | Hawkes |
| 2013/0247159 A1 | 9/2013 | Hall et al. |
| 2013/0262309 A1* | 10/2013 | Gadotti ............ G06Q 20/3276 705/44 |
| 2013/0262315 A1 | 10/2013 | Hruska |
| 2013/0275308 A1 | 10/2013 | Paraskeva et al. |
| 2014/0090035 A1 | 3/2014 | Kodama |

\* cited by examiner

SYSTEMS AND METHODS FOR TRANSFERRING PERSONAL DATA USING A SYMBOLOGY

BACKGROUND

Recently, the use of mobile devices, such as smartphones and the like, has rapidly increased. This increase has resulted in part from the porting of technologies to mobile electronic devices that were once limited to non-mobile applications. Mobile technologies provide the promise of a more efficient use of time by allowing interactions with other people and entities at any time and place.

One way in which individuals interact with others is by providing personal data. For example, an individual could be required to provide personal data as part of a registration process on an online website. Similarly, personal data could be required in order to complete a purchase transaction. In current systems, personal data is entered into online forms by having the individual enter the information when accessing a new website.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a method of requesting personal data from a user via a symbology may include transmitting, by an entity computing device, a request for data to perform a personal data access to a remote computing device, receiving, by the entity computing device, a transaction code and a symbology from the remote computing device in response to the request, displaying the symbology, and receiving, by the entity computing device, personal data for a user.

In an embodiment, a method of automating insertion of personal data for a user into an online form may include scanning, by a user electronic device associated with a user, a symbology displayed by an entity, where the symbology encodes data associated with a request for personal data therein, decoding, by the user electronic device, the data from the symbology, and transmitting, by the user electronic device, the data to a remote computing device.

In an embodiment, a system for requesting personal data from a user via a symbology may include a computing device and a processor-readable storage medium in communication with the computing device. The processor-readable storage medium may contain one or more programming instructions that, when executed, cause the computing device to transmit a request for data to perform a personal data access to a remote computing device, receive a transaction code and a symbology from the remote computing device in response to the request, display the symbology, and receive personal data for a user.

In an embodiment, a system for requesting personal data from a user via a symbology may include a computing device and a processor-readable storage medium in communication with the computing device. The processor-readable storage medium contains one or more programming instructions that, when executed, cause the computing device to scan a symbology displayed by an entity, where the symbology encodes data associated with a request for personal data therein, decode the data from the symbology, and transmit the data to a remote computing device.

DETAILED DESCRIPTION

The following terms shall have, for the purposes of this application, the respective meanings set forth below.

An "electronic device" refers to a device that includes a processing device and tangible, computer-readable memory. The memory may contain programming instructions that, when executed by the processing device, cause the device to perform one or more operations according to the programming instructions. Examples of electronic devices include personal computers, gaming systems, televisions and mobile devices.

A "mobile device" refers to an electronic device that is generally portable in size and nature. Accordingly, a user may transport a mobile device with relative ease. Examples of mobile devices include pagers, cellular phones, feature phones, smartphones, personal digital assistants (PDAs), cameras, tablet computers, phone-tablet hybrid devices, laptop computers, netbooks, ultrabooks, global positioning satellite (GPS) navigation devices, in-dash automotive components, media players, watches and the like.

A "computing device" is an electronic device, such as, for example, a computer, a server or components thereof. The computing device can be maintained by entities such as financial institutions, corporations, governments, and/or the like. The computing device may generally contain a memory or other storage device for housing programming instructions, data or information regarding a plurality of users, such as, for example, contact information, personal information, account information, account balances, account numbers and service login information. The computing device may also have data regarding product inventories, billing information, purchase order information, contracts, bills of sale, and/or the like. The data may optionally be contained on a database, which is stored in the memory or other storage device. The data may optionally be secured by any method now known or later developed for securing data. The computing device may further be in operable communication with one or more electronic devices, such as, for example, the mobile devices described herein. The communication between the computing device and each of the mobile devices may further be secured by any method now known or later developed for securing transmissions or other forms of communication. The computing device may further contain a registry of "authorized users" wherein the authorized users are users that have registered to use the systems and methods described herein. Users may obtain "authorized user" status by, for example, providing contact information, account information, and/or the like.

Figure 1:
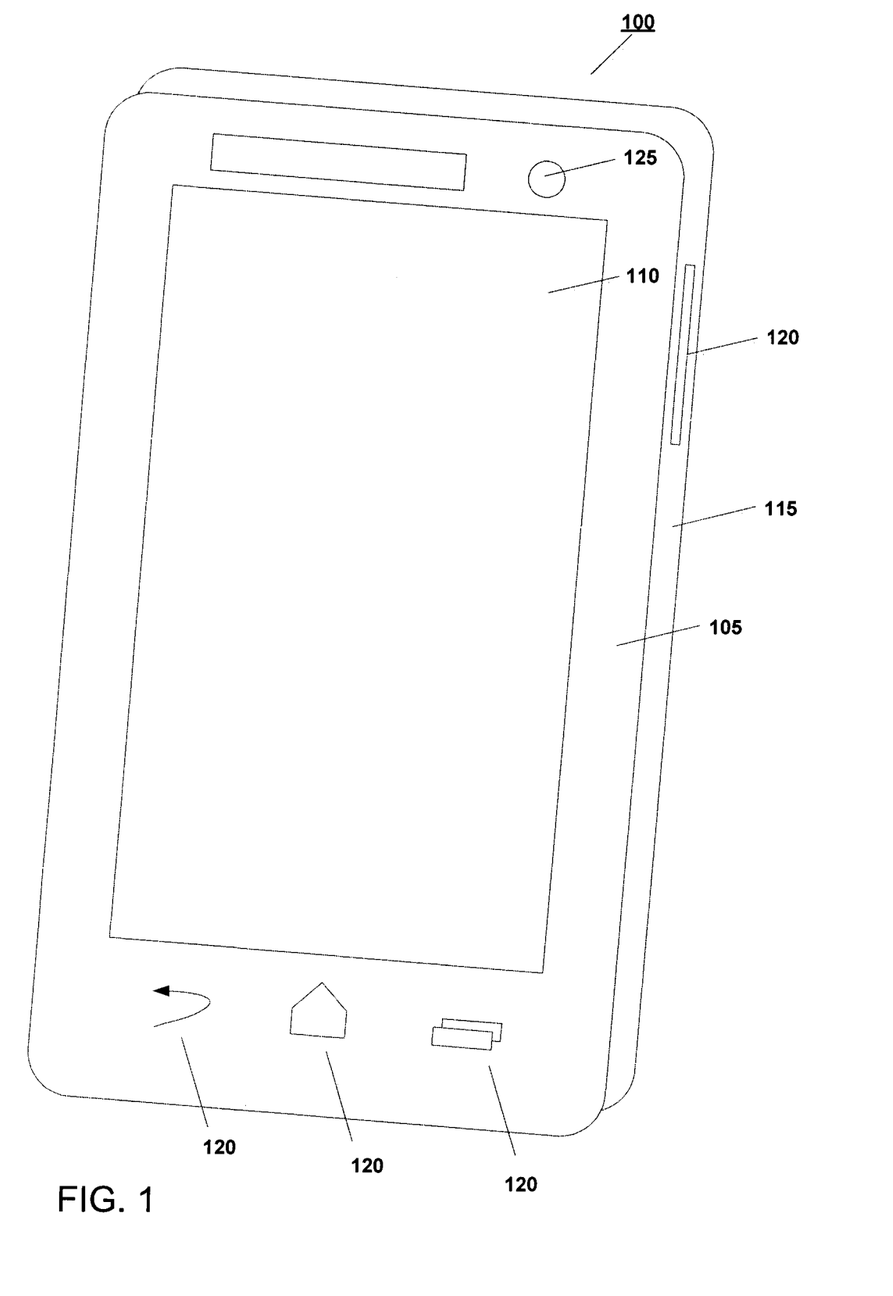
FIG. 1 depicts a perspective view of a first and second face of a mobile device according to an embodiment.

A "symbology" is a pattern, a symbol, an image or the like, as well as portions and combinations thereof, that is displayed on a substrate, such as, for example, the display depicted in FIG. 1. The symbology provides an optical, electronically-readable encoded representation of data. Symbologies can include, without limitation, one-dimensional barcodes, two-dimensional (2D) barcodes or three-dimensional barcodes. Examples of two-dimensional barcodes include data matrix codes, quick response codes, Aztec codes, Maxi codes and the like. Symbologies can also include letters, numbers, punctuation and other symbols. The symbology may be displayed on a display and may be of any geometric shape or size. In this document, the terms "barcode" or "matrix code" may be used in the examples, but the term is intended to include any type of symbology.

Figure 6:
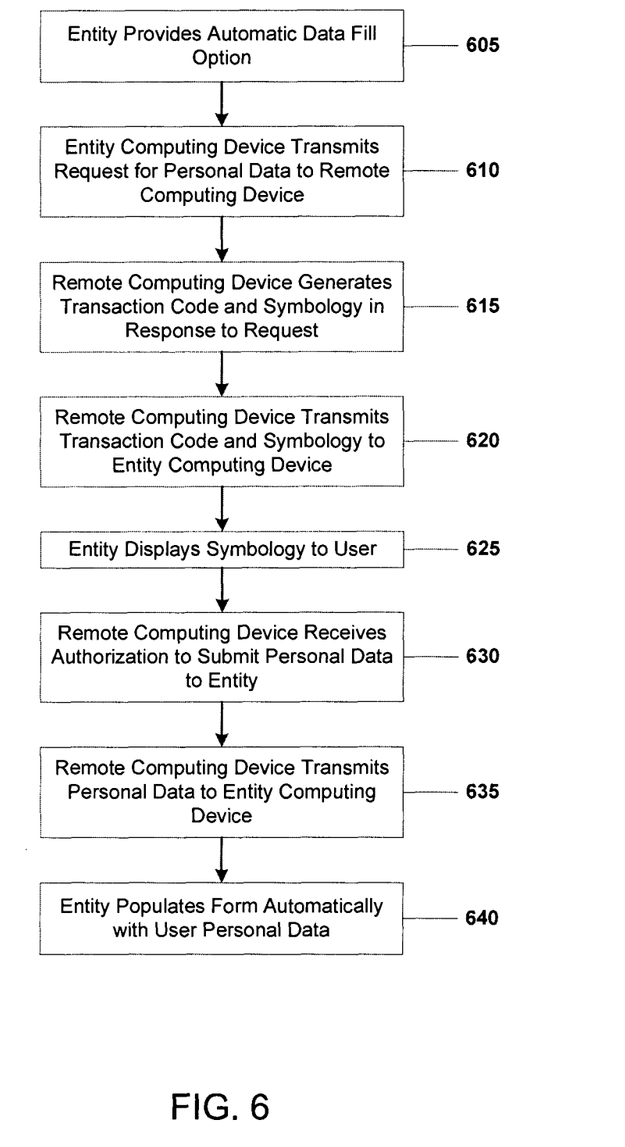
FIG. 6 depicts a flow diagram of an illustrative process for automating insertion of personal data for a user into an online form according to an embodiment.
Figure 7:
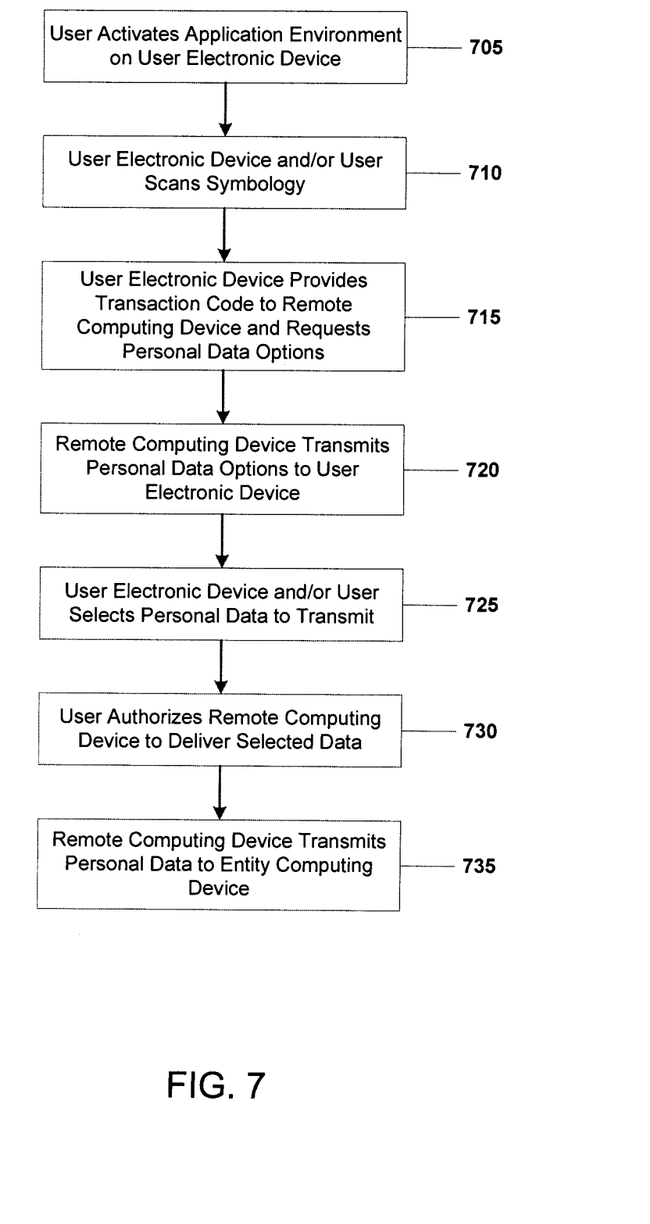
FIG. 7 depicts a flow diagram of an illustrative process for requesting personal information for a user according to an embodiment.

An "application environment" is an embodiment of programming instructions that direct the various components of each electronic device to execute a plurality of steps, such as those described in more detail in FIGS. 6 and 7. The application environment, when contained in a mobile device, may be referred to as a "mobile application environment." Similarly, the application environment, when contained in a computing device, may be referred to as a "computing application environment." The mobile application environment may be a software application or the like, such as a smartphone "app." The mobile application environment may generally provide a means for reading, decoding, encoding and communicating the data encoded by a symbology. The computing application environment may generally provide a means for communicating with each mobile device, a means for reading, translating and transmitting data, and a means for completing other tasks, as described in greater detail herein.

FIG. 1 depicts a perspective view of a mobile device, generally designated 100, according to an embodiment. The mobile device may have a first face 105 and a second face 115. The first face 105 may have a display 110. The display 110 may generally be a component for displaying images, text, video and the like. Examples of displays may include, but are not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays.

The mobile device 100 may be configured to generate a symbology and/or display the generated symbology on the display 110, as described in more detail herein. The mobile device 100 may generate the symbology by using any methods now known or later developed for creating and encoding symbologies. Alternatively, the mobile device 100 may receive the symbology from another mobile device and/or a computing device.

The mobile device 100 may further have one or more user interface components 120, which may be positioned on any face of the device, including, but not limited to, the first face 105 and the second face 115. The one or more user interface components 120 may generally be configured to elicit one or more commands to the mobile device 100 when actuated. Examples of user interface components 120 may include keypads, switches, buttons and/or the like.

As an alternative to, or in conjunction with the one or more user interface components 120, the display 110 may further include a touch sensitive screen, wherein the touch sensitive screen may act as a user interface component. The touch sensitive screen may receive contact based inputs from a user, such as from a user's fingers. The touch sensitive screen may be adapted for gesture control, thus allowing for a user to tap, pinch, swipe or provide other similar gestures to elicit commands to the mobile device 100. The touch sensitive screen may further be capable of sending touch commands to the processing device. Examples of touch sensitive screens may include, but are not limited to, resistive touchscreens, capacitive touchscreens, infrared touchscreens and/or other technologies now known or later developed. The mobile device 100 may also be adapted to receive commands via body gestures, voice, audio signals, device movement and/or the like.

Figure 2:
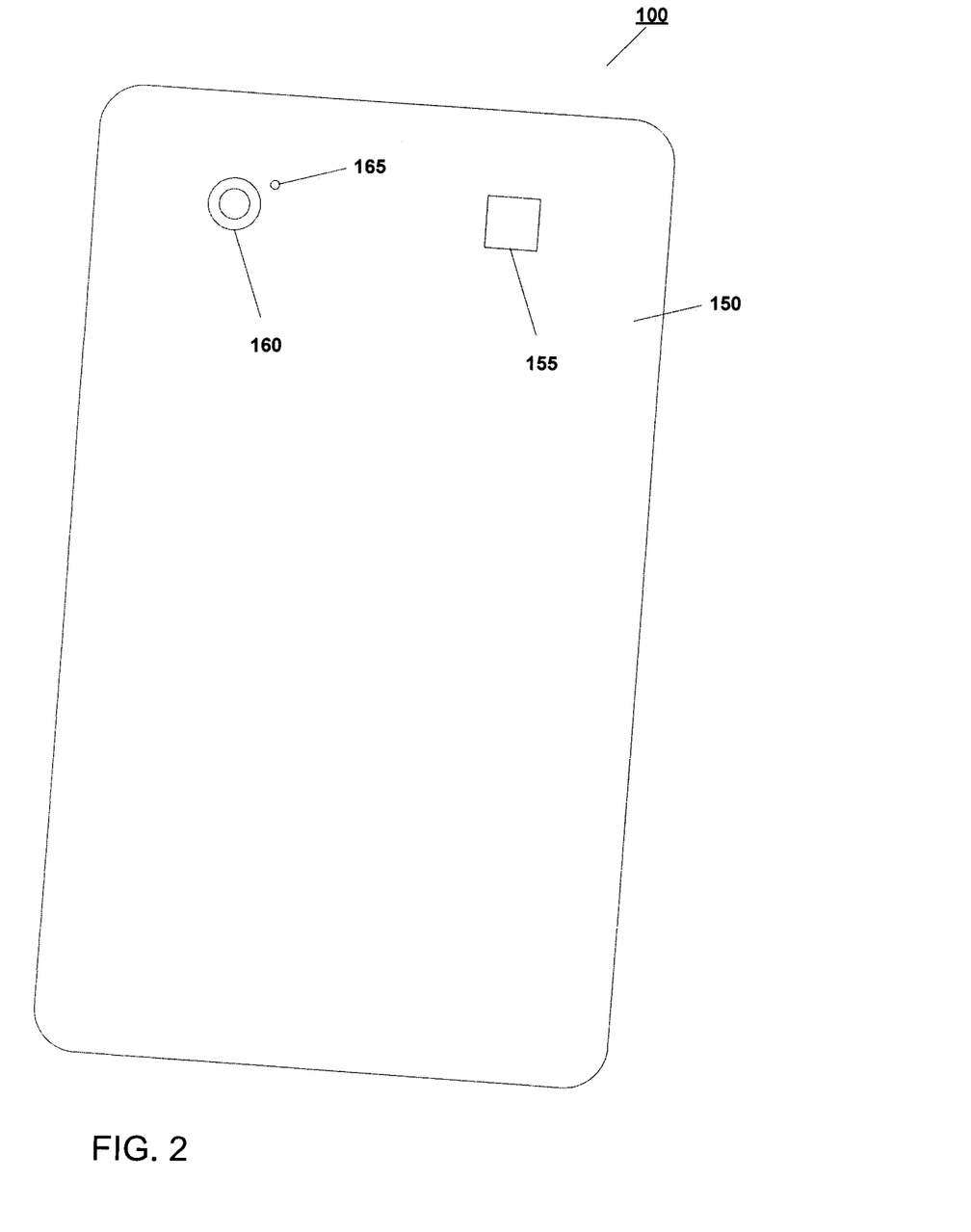
FIG. 2 depicts a perspective view of a third face of the mobile device in FIG. 1 according to an embodiment.

FIG. 2 depicts a perspective view of a third face 150 of the mobile device 100, according to an embodiment. The third face 150 may generally have an optical component 160. The third face 150 may also optionally have an audio component 155 and/or an illumination component 165.

The optical component 160 may be any suitable component capable of receiving an optical image and transmitting image information to other components of the mobile device 100 for processing, such as, for example, a camera. The optical component 160 may further have an ability to adjust its focal length and aperture in such a manner that would allow it to zoom and properly focus upon an intended object to be imaged. Such ability may be through mechanical components (such as an optical zoom) or programming (such as a digital zoom). This adjustment may define an "optimal focal distance," or a range of distances in which the mobile device 100 may be properly positioned from the intended object to be imaged to achieve a clear image.

While the optical component 160 is depicted on the rear face of the present example, persons skilled in the art will appreciate that the optical component 160 may be positioned at any location on or in any face of the mobile device 100, or may even be external to the mobile device 100 and connected by any means of communication, including, but not limited to, physical cable communication such as universal serial bus (USB), wireless radio communication, wireless light communication, or near field communication technology.

The optical component 160 may further be configured to receive an optical image on the display of another mobile device, such as, for example, a symbology displayed on the display of the other mobile device, as described in greater detail herein.

The optional illumination component 165 may be utilized in any light conditions to assist the optical component 160 in completing any of the tasks described herein. Additionally, the illumination component 165 may be independently activated to turn on or off at specific points in time, such as when additional lighting is necessary to capture an ideal image. Other features of the illumination component 165 may include dimming, strobe, constant on and/or the like.

The illumination component 165 may contain any suitable light source capable of providing illumination, including, but not limited to, magnesium-based flashes, xenon-based flashes, fulminate-containing flashes, light-emitting diode (LED) flashes and the like. While the present figure depicts the illumination component 165 as being integrated with the mobile device 100, it may be appreciated that the illumination component 165 may be a separate component in communication with the mobile device 100, such as USB based flashes, hot shoe based flashes, remote slave flash units, or other similar devices.

The optional audio component 155 may be adapted to emit audio tones and signals. Such audio tones and signals may be used to instruct the user to complete various steps as described herein, and may further indicate to the user that an image has been received by the optical component 160 by emitting a beep, click or other audio signal. Additionally, the audio component 155 may be adapted to receive audio signals. Such audio signals may include, for example, voice commands from a user.

Figure 4:
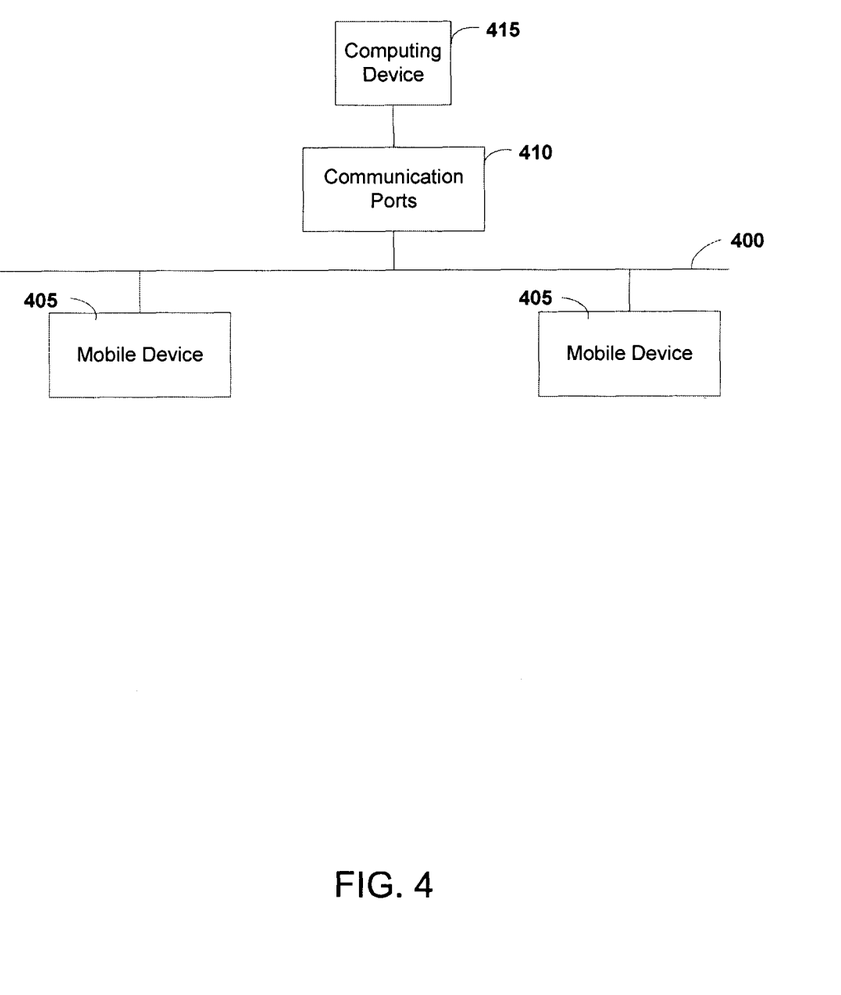
FIG. 4 depicts a block diagram of an illustrative communications system between mobile devices and a computing device according to an embodiment.

The mobile device 100 may further have an ability to connect to a communications network, as described in FIG. 4 herein. The types of communications networks that may be used in accordance with this disclosure are not limited in any manner, and may include any communications network now known or later developed. For example a communications networks may include, but is not limited to, the Internet, an intranet, a wide area network (WAN), a local area network (LAN), a wireless local area networks (WLAN), a storage area networks (SAN) and/or the like.

The configuration of the mobile device 100 as shown in FIGS. 1 and 2 is merely an example of a mobile device, and persons skilled in the art will appreciate that other configurations and embodiments will be possible without departing from the scope of this disclosure.

Figure 3:
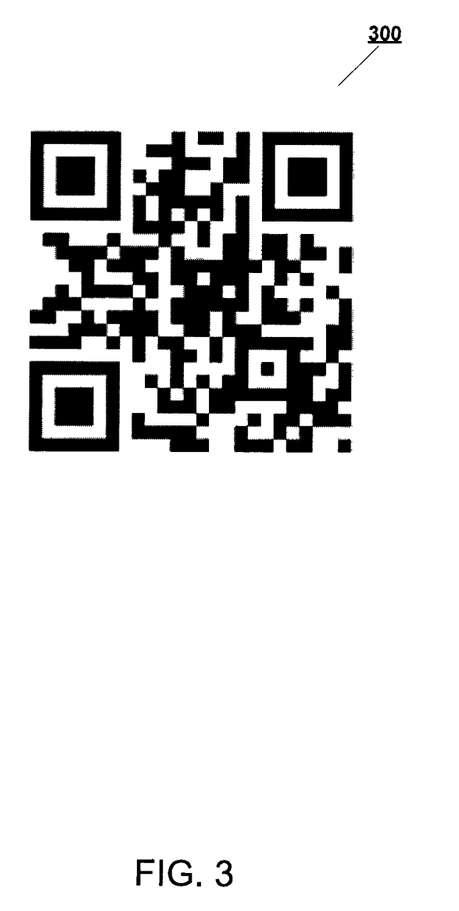
FIG. 3 depicts a symbology according to an embodiment.

FIG. 3 depicts an example of a symbology, generally designated 300, that may be used in accordance with an embodiment. The symbology 300 may be displayed, for example, on the display 110 of the mobile device 100 (FIG. 1) or affixed to a substrate.

The symbology 300 may be generated by a mobile device 100, or may be generated by any other electronic device, such as for example, a computing device. In instances where the symbology 300 is generated by anything other than the mobile device 100, it may be transmitted to the mobile device 100 for further use, such as for display upon the display 110 (FIG. 1), addition to other documents and/or elements, or for scanning, reading or decoding.

The symbology 300 may be encoded with data that may generally be used by a computing device to gain access to secured information. Examples of secured information may include, but are not limited to, information regarding a user's banking account, an amount of money to be sent and/or received, a date and time of transmission of money for future payments, and/or the like. The symbology 300 may further be encoded with other data, such as, for example, information regarding a product or a service, information regarding a payee, purchase payment information, information about a bill and purchase order information.

The information encoded in the symbology 300 may further be encrypted. In instances where the information encoded in the symbology 300 is encrypted, the symbology 300 may only be read by certain symbology reading devices and/or applications, such as those that contain or maintain access to an encryption key or another similar means for decrypting the information encoded in the symbology 300. Encryption may be completed by any encryption method now known or later developed. Examples of encryption may include, but are not limited to, manual encryption, transparent encryption, symmetric encryption, asymmetric encryption and the like.

As an alternative to being encrypted, the symbology 300 may be readable by any symbology reading device and/or application. However, the information encoded within the symbology 300 may appear to a user of the symbology reading device and/or application as a random placement of characters, numbers, symbols and the like. However, if the symbology 300 is read using the application environment, the application environment may recognize the characters, numbers, symbols and the like and may perform or complete tasks accordingly, as described in more detail herein.

The symbology 300 may be a standalone image, or may be incorporated within another object, such as, for example, an additional image, text, icons and/or the like. In instances where the symbology 300 is incorporated within another object, the other object may provide at least a portion of the information encoded by the symbology 300.

FIG. 4 depicts a block diagram of communications between one or more electronic devices and one or more computing devices. A communications network 400 may serve as an information highway interconnecting the other illustrated components. The communications network is not limited by this disclosure, and may include any communications network now known or later developed. Examples of communications networks may include, but are not limited to, the Internet, intranets, wired networks and wireless networks. One or more electronic devices 405, such as mobile devices, computing devices and the like may connect to the communications network 400. In embodiments where a plurality of electronic devices 405 are connected to the communications network 400, each electronic device 405 may be configured to communicate with other electronic devices via the communications network 400. A computing device 415 may also be connected to the communications network 400, and may optionally connect through the use of one or more communications ports 410.

Figure 5:
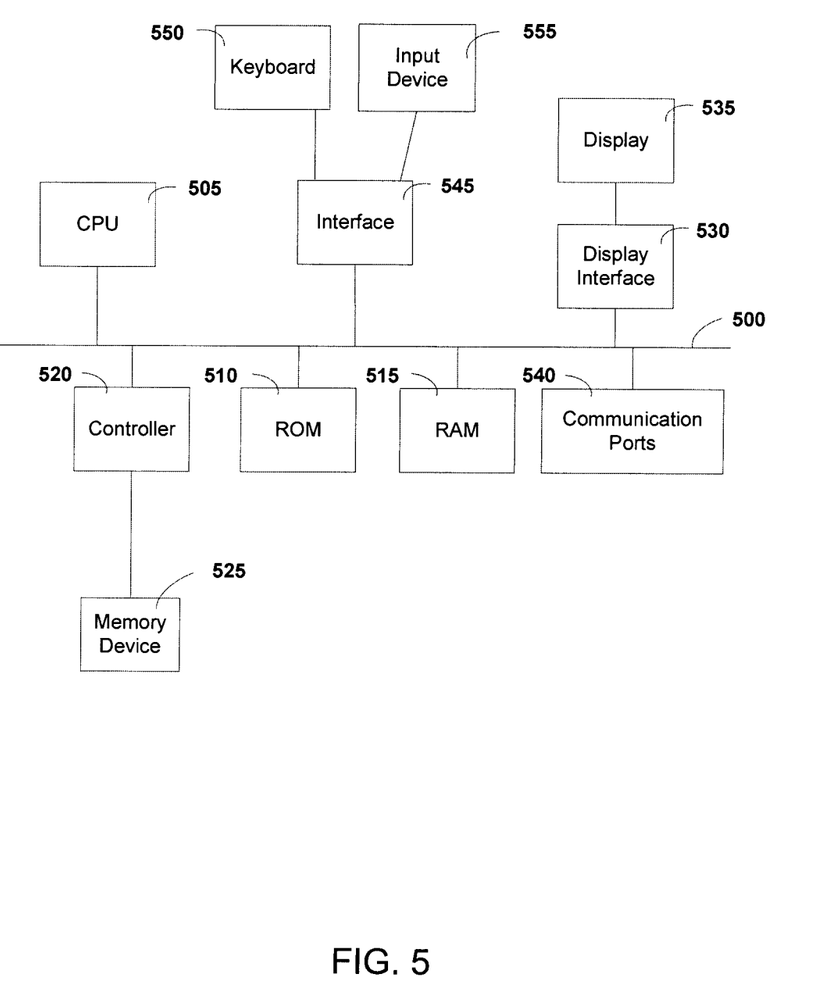
FIG. 5 depicts a block diagram of illustrative internal hardware that may be used to contain or implement program instructions according to an embodiment.

FIG. 5 depicts a block diagram of illustrative internal hardware that may be used to contain or implement program instructions, such as the process steps discussed herein in reference to FIGS. 6 and 7, according to embodiments. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an illustrative processing device, computing device or processor as such terms are used within this disclosure. Read only memory (ROM) 510 and random access memory (RAM) 515 constitute illustrative memory devices (i.e., processor-readable non-transitory storage media).

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-ray™ disc, and/or other non-transitory storage media.

An optional display interface 530 may permit information from the bus 500 to be displayed on the display 535 in audio, visual, graphic or alphanumeric format. Communication with external devices, such as a print device, may occur using various communication ports 540. An illustrative communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

FIG. 6 depicts a flow diagram of an illustrative process for transferring personal data for a user to an online form according to an embodiment. For the purposes of the present example, a user interacts with an entity that operates a website. However, other interactions between a user and an entity are possible, including, without limitation, a user with an entity data registry in which the user provides information to register with a service, but does not interact with the service at the time at which the data is provided.

As shown in FIG. 6, an entity provides 605 an automatic data fill option and a manual filling option. The manual filling option enables a user to access a location, such as a website, and provide information to the entity for a variety of purposes, such as a purchase transaction or a registration process. The automatic data fill option enables the website to automatically complete the form for the user in order to avoid wasting the user's time and also to avoid data entry errors. The entity computing device transmits 610 the request to a remote computing device. In an embodiment, the entity may be a merchant or other organization that requests personal data from users as part of purchase transactions. In an alternate embodiment, the entity may request personal data from users as part of a registration process. Additional and/or alternate reasons for requesting personal data are intended to be covered within the scope of this disclosure. The remote computing device may be one or more servers, computers, or other processing devices used, at least in part, to identify requests for personal data.

In an embodiment, the request for personal data may identify one or more fields for which data is requested. For example, the request may identify one or more of a physical address, a telephone number, a name, and an email address associated with a user. Additional and/or alternate fields may also be requested within the scope of this disclosure.

The remote computing system may receive the request and generate 615 a transaction code and a symbology to represent the transaction code and/or the request. The associated transaction code may be an identifier used to identify the particular request for personal data. The transaction code and other information pertaining to the request, such as the type of personal data to send to the entity computing device for a particular transaction code, may be stored in a non-transitory storage medium that is in operable communication with the remote computing device. The transaction code is not limited by this disclosure and may include any object that acts as an identifier to the remote computing device. The transaction code may include a unique identifier that directs the remote computing device to access one or more particular types of personal data.

The remote computing device may transmit 620 the transaction code and the symbology to the entity computing device. In an embodiment, the entity computing device may generate its own identifier to associate with the transaction code.

The entity may display 625 the symbology as part of a display requesting that a user provide personal data to the entity. For example, the symbology may be displayed 625 on a webpage as one of a plurality of options for filling out an online form. Alternately, it may be displayed on a physical display as part of a prompt to receive information from a user for a registration process.

In an embodiment, a user electronic device may authorize 630 the remote computing device to send personal data of a user associated with the user electronic device to the entity computing device. In particular, the user electronic device may provide 630 authorization to send personal data of the user in response to scanning the symbology. The operations performed by the user electronic device are described in further detail below in reference to FIG. 7.

The remote computing device may forward 635 the personal data to the entity computing device based on the authorization. The entity computing device may receive the personal data from the remote computing device and populate 640 an online form with the personal data. Based on the particular application being performed, the personal data may be displayed to the user via a form on a webpage. Alternately, the personal data may be stored in a database record without being displayed to the user.

In an alternate embodiment, the user electronic device may provide 630 an authorization to the remote computing device to deliver a listing of one or more types of personal data to the entity computing device. In other words, rather than providing a particular name, address, or the like, the user electronic device may provide a designation that that remote computing device should provide the name, address or the like associated with a user account that is associated with the user electronic device. In such an embodiment, the user may pre-store the personal data in the user account as part of a registration process. In such an embodiment, the remote computing device may receive the listing of one or more types of personal data, retrieve the personal data from the user account, and transmit 635 the personal data to the entity computing device. As above, the entity computing device may receive the personal data from the remote computing device and populate 640 an online form with the personal data. Based on the particular application being performed, the personal data may be displayed to the user via a form on a webpage. Alternately, the personal data may be stored in a database record without being displayed to the user.

FIG. 7 depicts a process that may be carried out by an application environment in response to a user determining to provide personal data via an electronic device. A user may interact with the entity or an entity computing device and be requested and/or required to supply personal data in order to complete a transaction, a registration process or the like. In such an instance, the symbology may be displayed and the user may elect to provide personal data in this manner.

Accordingly, the user may activate 705 an application environment on the user electronic device. The application environment may permit the user, via a user electronic device, to interact with the symbology, and by extension the entity computing device. In an embodiment, the application environment may be activated 705 on a mobile electronic device, such as, for example, the mobile device depicted in FIGS. 1 and 2, although any electronic device may be used within the scope of this disclosure.

The user may scan 710 the symbology using the application environment on the user electronic device. Scanning 710 the symbology may be performed by any means now known or later developed for viewing, reading and/or decoding symbologies.

As a result of the scanning 710, the application environment on the user electronic device may decode the symbology in order to identify a transaction code. The user electronic device may provide 715 the transaction code to the remote computing device in order to determine the personal data options available. A particular symbology may be associated with a plurality of personal data options from which the user can select. For example, the symbology may request an address, but the user associated with the user electronic device may have both a home address and a business address stored. In response to receiving the transaction code, the remote computing device may transmit 720 personal data options to the user electronic device.

The user and/or the user electronic device may determine 725 the personal data that the remote computing device is to send to the entity computing device and forward such information to the remote computing device. In addition, the user may authorize 730 the remote computing device to transmit the selected data.

The remote computing device, in response to receiving the authorization, may transmit 735 the selected personal data to the entity computing device. The entity computing device may use the data to automatically populate a form as described above in reference to FIG. 6.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of requesting personal data via a symbology, the method comprising:
    transmitting, by an entity computing device, a request for personal data to a remote computing device in response to a user's request to have a form automatically populated by the entity computing device with the personal data;
    receiving, by the entity computing device, a transaction code and a symbology from the remote computing device in response to the request, wherein the symbology is generated by the remote computing device and contains data encoded thereon that corresponds to the personal data held by the remote computing device;
    displaying, by the entity computing device, the symbology to the user such that the user can scan the symbology with a user electronic device; and
    receiving, by the entity computing device, the personal data for the user from the remote computing device when the symbology is scanned by the user electronic device and the data from the symbology is transmitted to the remote computing device, wherein the personal data is transmitted to the entity computing device by the remote computing device in response to the remote computing device receiving authorization from the user electronic device that the symbology has been scanned.

2. The method of claim 1, further comprising:
    associating, by the entity computing device, the symbology with an entity session identifier.

3. The method of claim 1, wherein displaying the symbology comprises displaying the symbology as part of a website.

4. The method of claim 1, further comprising:
    populating the form with the personal data for the user.

5. The method of claim 1, wherein displaying the symbology comprises displaying the symbology as part of a physical display.

6. The method of claim 1, wherein the symbology comprises one or more of a multi-dimensional bar code and a quick response (QR) code.

7. The method of claim 1, wherein the transaction code comprises a unique identifier that permits the remote computing device to associate the symbology and the request.

8. The method of claim 1, wherein the personal data comprises data pertaining to one or more of a physical address, a telephone number, a name, and an email address associated with the user.

9. A method of automating insertion of personal data for a user into an online form, the method comprising:
    scanning, by a user electronic device, a symbology displayed by an entity computing device, wherein the symbology is generated by a remote computing device and encodes data therein, wherein the data is associated with a request for personal data located on the remote computing device, and wherein the user electronic device is associated with the user;
    decoding, by the user electronic device, the data from the symbology;
    transmitting, by the user electronic device, the data to the remote computing device as an authorization message, wherein, upon receipt of the authorization message, the remote computing device is configured to provide the personal data to the entity computing device for insertion into the online form.

10. The method of claim 9, further comprising:
    receiving, by the user electronic device, one or more personal data options from the remote computing device, wherein each personal data option comprises one or more types of personal data; and
    transmitting, by the user electronic device, a selection of at least one personal data option to the remote computing device.

11. The method of claim 9, wherein the data comprises a unique identifier that directs the remote computing device to access one or more particular types of personal data.

12. The method of claim 9, wherein the personal data pertains to one or more of a physical address, a telephone number, a name, and an email address associated with the user.

13. The method of claim 9, wherein the symbology comprises one or more of a multi-dimensional bar code and a quick response (QR) code.

14. A system for requesting personal data via a symbology, the system comprising:
    a processor; and
    a non-transitory processor-readable storage medium in communication with the processor, wherein the non-transitory processor-readable storage medium contains one or more programming instructions that, when executed, cause the processor to:
    transmit a request for data for personal data from a remote computing device in response to a user's request to have a form automatically populated by the processor with the personal data,
    receive a transaction code and a symbology from the remote computing device in response to the request, wherein the symbology is generated by the remote computing device and contains data encoded thereon that corresponds to the personal data held by the remote computing device,
    display the symbology to the user such that the user can scan the symbology with a user electronic device, and
    receive personal data for the user from the remote computing device when the symbology is scanned by the user electronic device and the data from the symbology is transmitted to the remote computing device, wherein the personal data is transmitted to the entity computing device by the remote computing device in response to the remote computing device receiving authorization from the user electronic device that the symbology has been scanned.

15. The system of claim 14, wherein the one or more programming instructions further comprise one or more programming instructions that, when executed, cause the processor to associate the symbology with an entity session identifier.

16. The system of claim 14, wherein the one or more programming instructions that, when executed, cause the processor to display the symbology comprise one or more programming instructions that, when executed, cause the processor to display the symbology as part of a website.

17. The system of claim 14, wherein the one or more programming instructions further comprise one or more programming instructions that, when executed, cause the processor to populate the form with the personal data for the user.

18. The system of claim 14, wherein the one or more programming instructions that, when executed, cause the processor to receive the person data for the user comprise one or more programming instructions that, when executed, cause the processor to receive the personal data for the user from the remote computing device.

19. The method of claim 14, wherein the symbology comprises one or more of a multi-dimensional bar code and a quick response (QR) code.

20. A system for requesting personal data via a symbology, the system comprising:
 a processor; and
 a non-transitory processor-readable storage medium in communication with the processor, wherein the non-transitory processor-readable storage medium contains one or more programming instructions that, when executed, cause the processor to:
 scan a symbology displayed by an entity computing device, wherein the symbology is generated by a remote computing device and encodes data therein, wherein the data is associated with a request for personal data located on the remote computing device, and wherein the user electronic device is associated with a user,
 decode the data from the symbology, and
 transmit the data to the remote computing device as an authorization message, wherein, upon receipt of the authorization message, the remote computing device is configured to provide the personal data to the entity computing device for insertion into the online form.

21. The system of claim 20, wherein the one or more programming instructions further comprise one or more programming instructions that, when executed, cause the processor to:
 receive one or more personal data options from the remote computing device, wherein each personal data option comprises one or more types of personal data; and
 transmit a selection of at least one personal data option to the remote computing device.

22. The system of claim 20, wherein the data comprises a unique identifier that directs the remote computing device to access one or more particular types of personal data.

23. The method of claim 20, wherein the symbology comprises one or more of a multi-dimensional bar code and a quick response (QR) code.

\* \* \* \* \*